(12) United States Patent
Omer

(10) Patent No.: US 7,619,320 B2
(45) Date of Patent: Nov. 17, 2009

(54) HYDRO ELECTRICAL GENERATOR

(76) Inventor: Bndean Abdulkadir Omer, 206 Holdenhurst Road, Bournemouth BH8 8AT (SE)

( * ) Notice: Subject to any disclaimer, the term of this patent is extended or adjusted under 35 U.S.C. 154(b) by 0 days.

(21) Appl. No.: 11/634,326

(22) Filed: Dec. 5, 2006

(65) Prior Publication Data

US 2008/0169654 A1 Jul. 17, 2008

(30) Foreign Application Priority Data

Dec. 6, 2005 (GB) ................................ 0524784.6

(51) Int. Cl.
*F03B 13/00* (2006.01)
*F03D 9/00* (2006.01)
*B60L 11/02* (2006.01)
*B61C 9/38* (2006.01)

(52) U.S. Cl. .............................. 290/54; 290/45; 290/55

(58) Field of Classification Search .................. 290/54, 290/42, 55

See application file for complete search history.

(56) References Cited

U.S. PATENT DOCUMENTS

| | | | | |
|---|---|---|---|---|
| 1,015,627 A | * | 1/1912 | Master | 415/60 |
| 1,350,265 A | * | 8/1920 | Recuero | 415/66 |
| 1,368,454 A | * | 2/1921 | Rebman | 416/85 |
| 1,388,686 A | * | 8/1921 | Zaugg | 251/89 |
| 1,476,457 A | * | 12/1923 | Miller | 415/66 |
| 2,097,286 A | * | 10/1937 | McGee | 290/54 |
| 2,753,690 A | * | 7/1956 | Campbell | 405/78 |
| 3,644,052 A | * | 2/1972 | Lininger | 415/7 |
| 3,687,567 A | * | 8/1972 | Lininger | 415/7 |
| 3,697,765 A | * | 10/1972 | Carini | 290/54 |
| 3,883,261 A | * | 5/1975 | Saxmann | 415/7 |
| 3,920,354 A | * | 11/1975 | Decker | 416/117 |
| 3,983,404 A | * | 9/1976 | Sherrard | 290/53 |
| 3,995,170 A | * | 11/1976 | Graybill | 290/55 |
| 4,001,596 A | * | 1/1977 | Kurtzbein | 290/53 |
| 4,023,041 A | * | 5/1977 | Chappell | 290/53 |
| 4,047,833 A | * | 9/1977 | Decker | 415/4.4 |
| 4,048,947 A | * | 9/1977 | Sicard | 440/8 |
| 4,076,448 A | * | 2/1978 | Sanders, Jr. | 415/198.1 |
| 4,095,422 A | * | 6/1978 | Kurakake | 60/398 |
| 4,127,356 A | * | 11/1978 | Murphy | 415/4.1 |
| 4,134,710 A | * | 1/1979 | Atherton | 416/117 |
| 4,191,507 A | * | 3/1980 | DeBerg | 416/117 |
| 4,224,793 A | * | 9/1980 | Gutsfeld | 60/398 |
| 4,241,283 A | * | 12/1980 | Storer, Sr. | 290/54 |
| 4,246,753 A | * | 1/1981 | Redmond | 60/398 |
| 4,296,602 A | * | 10/1981 | Hales et al. | 60/398 |
| 4,301,377 A | * | 11/1981 | Rydz | 290/43 |
| 4,346,305 A | * | 8/1982 | White | 290/55 |
| 4,398,096 A | * | 8/1983 | Faurholtz | 290/55 |
| 4,436,480 A | * | 3/1984 | Vary | 415/211.1 |
| 4,463,555 A | * | 8/1984 | Wilcoxson | 60/325 |
| 4,516,033 A | * | 5/1985 | Olson | 290/54 |
| 4,625,124 A | * | 11/1986 | Ching-An | 290/42 |

(Continued)

*Primary Examiner*—Nicholas Ponomarenko
*Assistant Examiner*—Pedro J Cuevas
(74) *Attorney, Agent, or Firm*—Howard M. Gitten; Edwards Angell Palmer & Dodge, LLP

(57) ABSTRACT

An hydraulic electrical generator comprises a plurality of water wheels, means connecting said wheels hydraulically in series with at least two said water wheels being driven in the same sense, an individual electrical generator driven individually by each said water wheel, and mechanical means mechanically connecting said at least two water wheels being driven in the same sense together.

10 Claims, 3 Drawing Sheets

U.S. PATENT DOCUMENTS

| | | | | |
|---|---|---|---|---|
| 4,679,985 A | * | 7/1987 | Worms | 416/119 |
| 4,684,817 A | * | 8/1987 | Goldwater | 290/55 |
| 4,731,545 A | * | 3/1988 | Lerner et al. | 290/54 |
| 4,843,249 A | * | 6/1989 | Bussiere | 290/53 |
| 4,960,363 A | * | 10/1990 | Bergstein | 415/3.1 |
| 5,038,049 A | * | 8/1991 | Kato | 290/55 |
| 5,088,884 A | * | 2/1992 | Bergstein | 415/3.1 |
| 5,136,174 A | * | 8/1992 | Simoni | 290/54 |
| 5,311,064 A | * | 5/1994 | Kumbatovic | 290/53 |
| 5,420,463 A | * | 5/1995 | Agostino | 290/54 |
| 5,440,175 A | * | 8/1995 | Mayo et al. | 290/54 |
| 5,511,942 A | * | 4/1996 | Meier | 415/220 |
| 5,664,418 A | * | 9/1997 | Walters | 60/398 |
| 5,735,665 A | * | 4/1998 | Kang | 415/3.1 |
| 5,760,515 A | * | 6/1998 | Burns | 310/115 |
| 5,789,826 A | * | 8/1998 | Kumbatovic | 290/53 |
| 5,882,143 A | * | 3/1999 | Williams, Jr. | 405/78 |
| 5,947,678 A | * | 9/1999 | Bergstein | 415/3.1 |
| 6,036,333 A | * | 3/2000 | Spiller | 362/192 |
| 6,069,409 A | * | 5/2000 | Fowler et al. | 290/55 |
| 6,097,104 A | * | 8/2000 | Russell | 290/54 |
| 6,109,863 A | * | 8/2000 | Milliken | 415/1 |
| 6,172,429 B1 | * | 1/2001 | Russell | 290/54 |
| 6,309,179 B1 | * | 10/2001 | Holden | 415/202 |
| 6,568,878 B2 | * | 5/2003 | Woodall et al. | 405/25 |
| 6,638,005 B2 | * | 10/2003 | Holter et al. | 415/4.2 |
| 6,655,907 B2 | * | 12/2003 | Brock et al. | 415/4.2 |
| 6,674,181 B2 | * | 1/2004 | Harbison | 290/55 |
| 6,734,576 B2 | * | 5/2004 | Pacheco | 290/55 |
| 6,972,088 B2 | * | 12/2005 | Yehuda | 210/156 |
| 6,981,376 B2 | * | 1/2006 | Dutta | 60/639 |
| 7,081,690 B2 | * | 7/2006 | Coman | 290/54 |
| 7,375,437 B2 | * | 5/2008 | Peckham | 290/54 |
| 7,462,949 B2 | * | 12/2008 | Coman | 290/54 |
| 2002/0041100 A1 | * | 4/2002 | Yumita et al. | 290/52 |
| 2002/0047374 A1 | * | 4/2002 | Yumita | 310/81 |
| 2002/0050719 A1 | * | 5/2002 | Caddell et al. | 290/54 |
| 2002/0113442 A1 | * | 8/2002 | Yumita | 290/54 |
| 2003/0122380 A1 | * | 7/2003 | Harbison | 290/55 |
| 2003/0133782 A1 | * | 7/2003 | Holter et al. | 415/4.2 |
| 2003/0197383 A1 | * | 10/2003 | Dutta | 290/1 R |
| 2006/0119107 A1 | * | 6/2006 | Coman | 290/54 |
| 2007/0029806 A1 | * | 2/2007 | Coman | 290/54 |
| 2007/0222219 A1 | * | 9/2007 | Peckham | 290/1 R |
| 2008/0231057 A1 | * | 9/2008 | Zeuner | 290/54 |
| 2009/0022597 A1 | * | 1/2009 | Bowie | 416/223 R |
| 2009/0160193 A1 | * | 6/2009 | Farb | 290/54 |

\* cited by examiner

HYDRO ELECTRICAL GENERATOR

FIELD OF THE INVENTION

This invention relates to an hydraulic electrical generator for generating electricity from water flow

BACKGROUND OF THE INVENTION

The invention is particularly but not exclusively designed to produce electricity from sources of naturally flowing water.

SUMMARY OF THE INVENTION

According to the invention, there is provided an hydraulic electrical generator comprising a plurality of water wheels connected hydraulically in series, each water wheel driving its own individual electrical generator, at least two of the water wheels being driven in the same sense and being mechanically connected together.

Adjacent water wheels may be driven in opposite senses.

The first waterwheel in the series may be fed by a venturi for increasing the water pressure.

Bypass means may be provided for bypassing the flow around one or more of the water wheels so that certain water wheels may be taken out of service.

All the water wheels rotating in the same sense may be mechanically connected together.

The water wheels may comprise drums carrying vanes on the exterior surface thereof, the vanes being pivoted to the drum surface so that they can be folded against the drum surface during the part of a drum rotation where they are not in contact with the water flow and means may be provided for unfolding the vanes before they come into contact with the water flow.

The vanes may comprise a first section which, in the unfolded condition, extends at right angles to the drum surface and a second section, generally at right angles to the first section in a direction opposite to the intended flow direction of the water flow. The second section of the vane may be curved so as to follow a notional surface coaxial with the drum.

Step up gearing may be provided between the drum and the associated generator to which end, the inner surface of the drum may be provided with a annular set of teeth which mate with a pinion gear connected to drive the associated generator.

BRIEF DESCRIPTION OF THE DRAWINGS

The invention will now be described in greater detail, by way of example, with reference to the drawings, in which:—

DESCRIPTION OF THE PREFERRED EMBODIMENTS

The generator of the invention is intended to be used with a natural source of water such as a river or stream, the water flow having the necessary momentum and kinetic energy to drive the generator. It is initially intended that the system should operate with horizontal flows of water, but where there is an incline or a drop in the natural flow, the system could be used vertically or inclined, thus providing a larger amount of energy.

Figure 1:
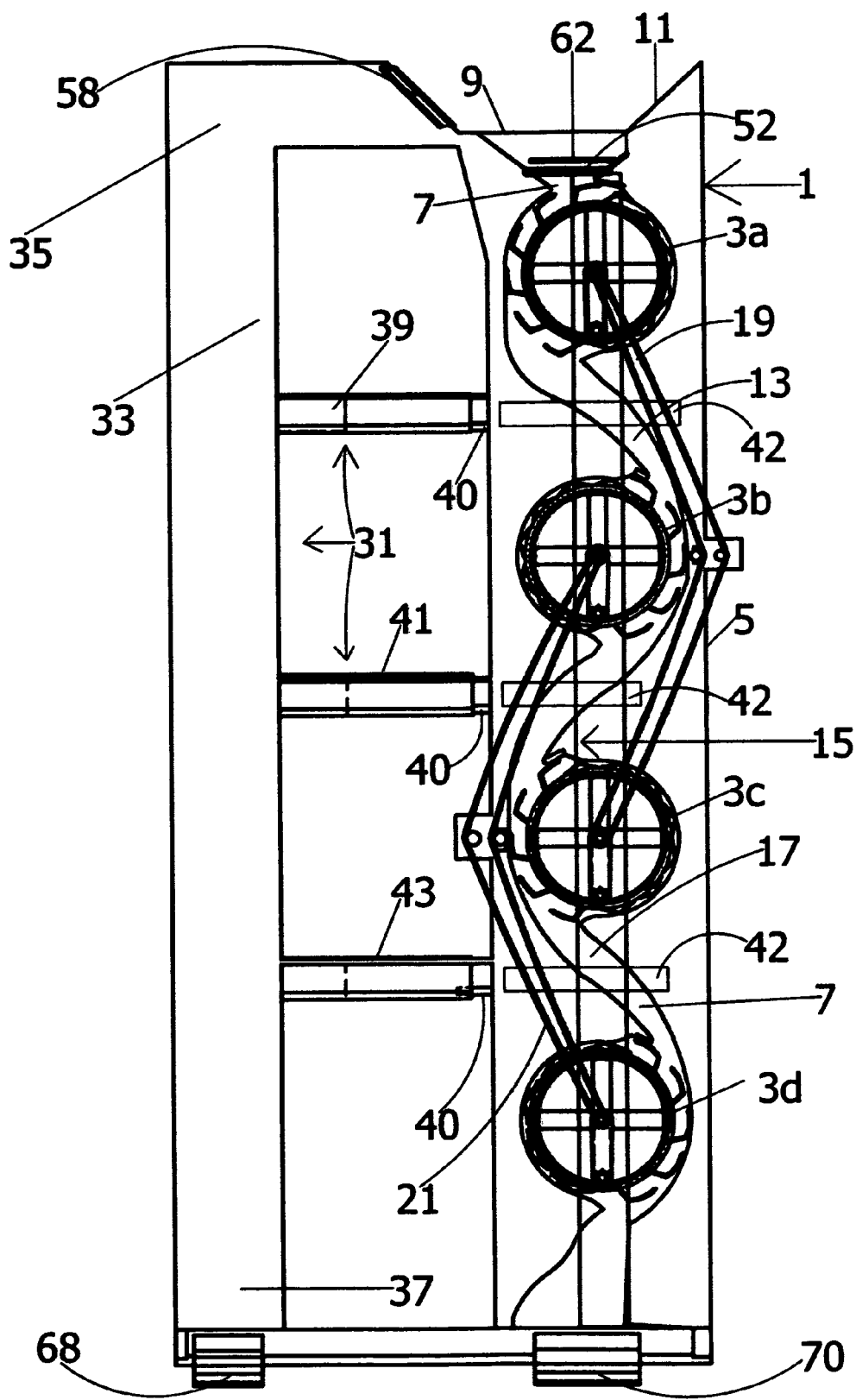
FIG. 1 is a plan view of a four waterwheel series hydraulic electrical generator in accordance with an embodiment of the invention.
Figure 2:
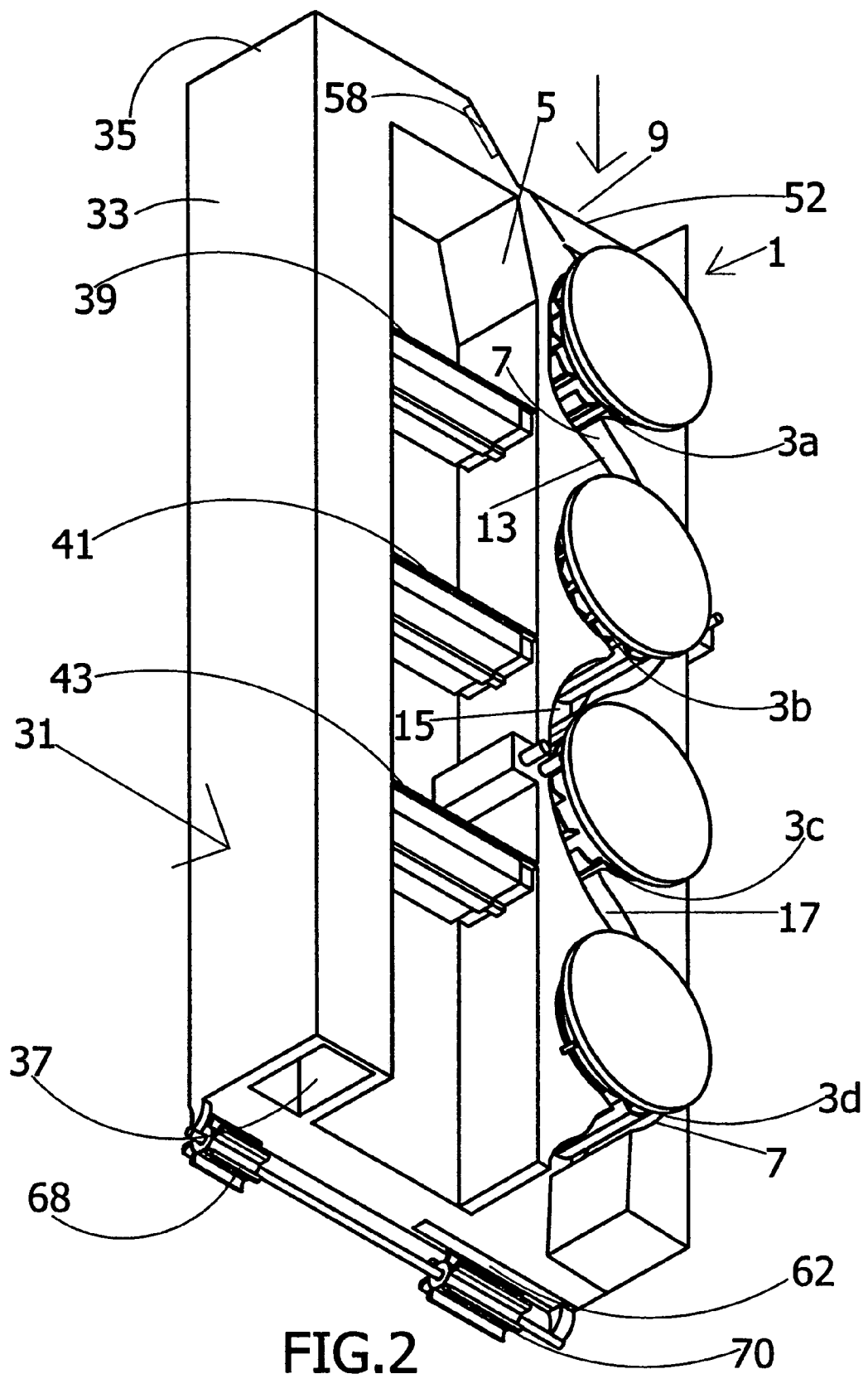
FIG. 2 is a perspective view of the hydraulic electrical generator of FIG. 1.
Figure 3:
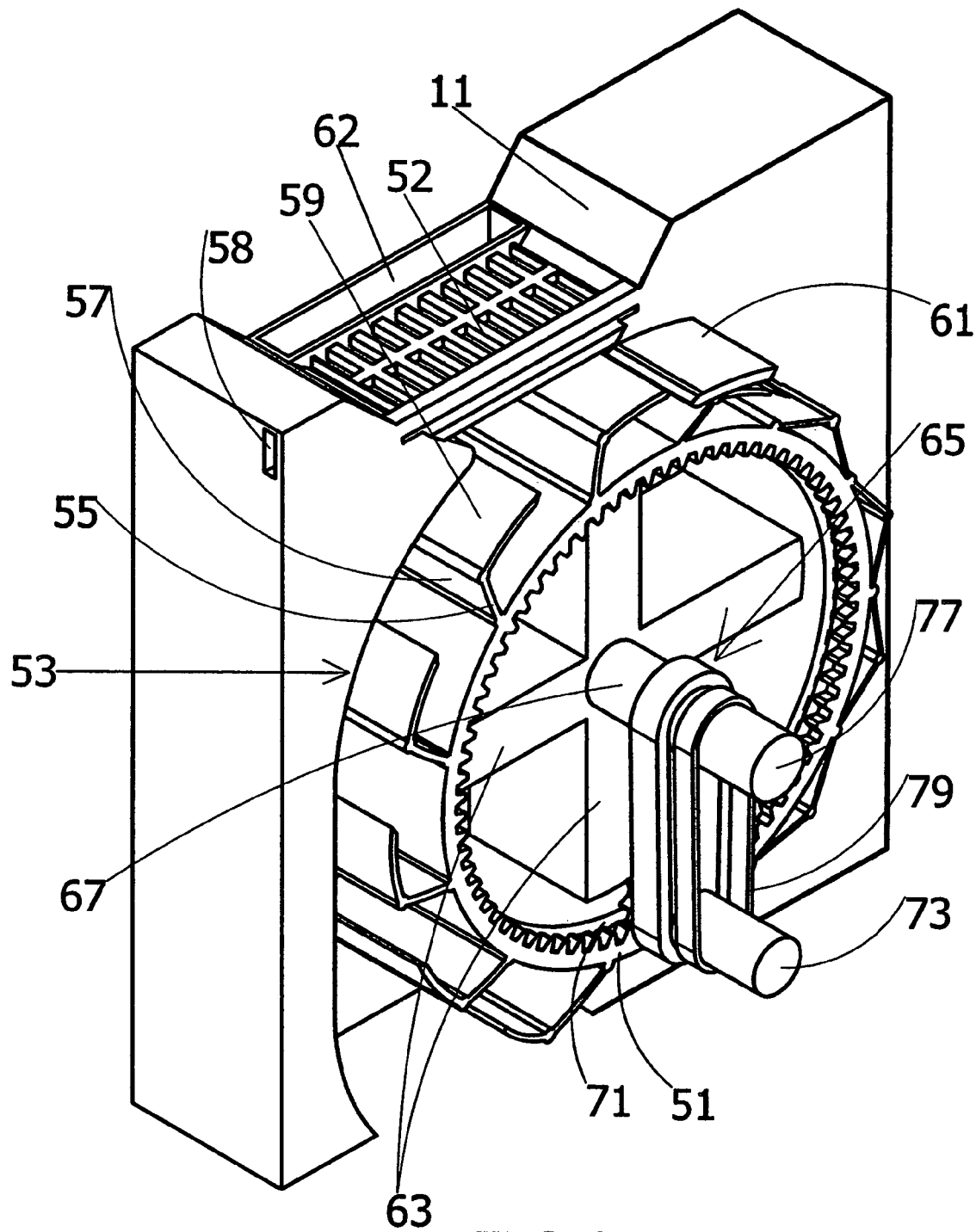
FIG. 3 is a perspective view of the first waterwheel section of the hydraulic electrical generator shown in FIGS. 1 and 2 to a larger scale.

Referring firstly to FIGS. 1 and 2, an hydraulic electrical generator 1 in accordance with the invention comprises a plurality of water wheels 3 connected in series hydraulically. In the presently described embodiment, there are four wheels connected in series but any suitable number may be used from two upwards.

The water wheels 3 are held in a framework 5 which is provided with a water channel 7 which follows a meandering path through the generator 1. At the inlet 9 to the channel 7, the water is directed to the left (as shown in the drawing) by means of an inclined section 11 to one side of the channel 7 which has the effect of narrowing the channel to create a venturi effect, thus increasing the pressure of the water. It also has the effect of directing the water to the left hand side of the first water wheel 3a causing it to rotate anti-clockwise.

As can be seen, the channel 7 takes in the left hand side of the water wheel 3a. After passing the first water wheel 3a the channel has a section 13 which proceeds transversely to the general direction of the water flow so as to direct the water flow on to the opposite or right hand side of the second waterwheel 3b causing this wheel to rotate in the opposite sense to the first water wheel 3a, namely clockwise. When the water flow passes from the second water wheel 3b, it encounters a second transverse section 15 inclined in the opposite direction to the first transverse section 13. Thus, the water flow is transferred to the left hand side of the third water wheel 3c causing it to rotate anticlockwise as in the case of the first water wheel 3a. From the third water wheel 3c to the fourth water wheel 3d, there is a third transverse section 17 of the channel 7 so that the direction of rotation of the fourth water wheel is reversed in respect to the first and third water wheel 3a and 3c.

The reason for the meandering course of the channel 7 is to provide the least resistance to the water flow which then follows a smooth course through the generator 1. Each water wheel 3 drives its own independent rotary electrical generator (not shown). This means that as will be explained later, should one of the water wheels 3 become non-operative, the remaining three water wheels will still continue to generate electricity.

Those water wheels which are rotating in the same sense are suitably connected together, for example by belt chain or other drive means 19 and 21 so that they will be driven together. Thus the drive 19 connects the first and third water wheels 3a and 3c while the drive 21 connects the second and third water wheels 3b and 3d.

Also provided is a water bypass system 31 which enables any one or more of the water wheels 3 to be bypassed and effectively taken out of service. This could be for a variety of reasons. Firstly, one of the water wheels 3 might need to be serviced. Or, alternatively, it might only be required for some of the rotary electrical generators to be used, depending on the power demand.

This bypass arrangement comprise a bypass channel 33 having an inlet end 35 into which the water flow which would normally enter the inlet 9 can be diverted if it is required to bypass the first water wheel 3a. The outlet end 37 of the channel 33 can feed the water back into the river or stream from which it was taken should the fourth water wheel 3d need to be bypassed. Intermediate the ends of the channel 33 are three cross channels 39, 41 and 43. These cross channels each connect with an associated transverse section of 13, 15 and 17 of the channel 7, Each of the cross channels can be used to supply water to or remove it from the channel 7 as required. Thus, for example, if the second water wheel 3*b* is to be bypassed, the water flow in the channel 7 will be diverted from the transverse section 13, conveyed into the bypass channel 33 and returned to the channel 7 at the transverse section 15 by way of the cross channel 41. If, on the other hand, the third wheel 3*c* is to be bypassed, the water flow in the channel will be diverted from the transverse section 15, conveyed to the bypass channel 33 and returned to the channel 7 at the transverse section 17. As shown particularly in FIG. 1, the cross channels 39 to 43 are provided with movable gates 40 which are arranged to divert the water flow by passing across the transverse sections 13, 15 and 17 of the flow channel 7 and into recesses 42 on the opposite sides of the channel 7

The construction of the individual water wheels will now be described in connection with FIG. 4 which is a perspective view of the first water wheel 3*a*.

The waterwheel 3*a* generally comprises a drum 51 which carries around it a number of vanes 53 which are individually pivoted on the drum 51 at 55. Each vane comprises a first portion 57 which, in use, stands up at 90 degrees to the surface of the drum 51 as shown to the left of FIG. 4, and a second section 59 which extends substantially at right angles to the first section 57 but is preferably curved so as to lie on a notional surface coaxial with the drum surface. This achieves the situation that the pressure of the water flow in the channel 7 impinges directly on the vane portion 57 while the second vane portion 59 retains the water in engagement with the surface of the vane portion 57. The second vane portion 59 is also acted upon by the water as the vane emerges into the water flow (at the top in FIG. 4) and also as the vane leaves the water flow (at the bottom in FIG. 4).

The pivotability of the vanes 53 allows the vanes 53 to pivot inwardly during the return movement of the vanes to reduce any resistance present. This takes place on the left hand side of FIG. 4. While the amount of this movement will depend on the resistance encountered, the vanes 53 can pivot until the free edge of the vane portion 59 engages the surface of the drum 51. At least the vane portion 59 is made of a magnetically attractable metal so that it can be acted upon by a magnet 61 situated at the upper part (in FIG. 4) of the drum 51 so that, as the vanes 53 pass the magnet 61, they are returned to the operative position discussed earlier.

The drum 51 is carried by a pair of cross members 63 at the centre of which is a two part shaft 65 on the outer element 67 of which the drum 51 runs. This outer element 67 is stationary. The inner surface at one side of the drum 51 is an annular toothed gear 71 which drives a pinion gear, only the shaft 73 of this gear being shown, carried by a stationary bracket 75 which in turn is carried by the stationary element 67 of the shaft 65. The pinion wheel drives the shaft 73 at a significantly greater rate than that of the drum 51 and in turn drives the inner element 77 of the shaft 65 through a belt 79. The inner element 77 of the shaft 65 drives an electrical generator, not shown, either directly or through further gearing. With an alternative structure of the drum 51, the generator may be built inside the drum 51 with the drum, for example, running on an outer casing of the generator. As will be appreciated, the wheel 3*a* rotates in a counter clockwise sense and will therefore be identical with the wheel 3*c* while the wheels 3*b* and 3*d*, which will rotate in the clockwise sense, will have their vanes extending in the opposite direction.

In order to provide protection against debris which may be present in the water flow, a grid 52 can be provided at the entrance to the first wheel 3*a*. Also, protection can be obtained against excessive amounts of water flow by the provision of bypass channels, one 62 of which can bypass water from the flow to the wheels 3 while another 58 of which bypasses the wheel bypass system 31. Finally, in the event that all of the wheels 3 need to be shutdown a minimum power supply can be generated by small generators 68 and 70 located at the outputs of the bypass channel 31 and of the wheel channel 13, 15, 17 etc. It is to be noted that these wheels would operate with their axes perpendicular to the axes of the wheels 3.

It will be understood that various modifications and additions to the above described embodiment may be made without departing from the scope of the invention. For example, while a system with four water wheels is shown any suitable number of water wheels may be used from two upwards. The water wheels may be banked so that more than one channel of water flow is provided.

Any suitable gearing can be arranged for the drum to drive the generator, and, for example, a complete chain of toothed gearing could be used or a full belt system could be used. Other designs of water wheel could be used, such as those with fixed vanes standing at ninety degrees to the surface of the drum or those having full buckets.

While it is useful for adjacent wheels to rotate in opposite senses, the arrangement would still work with wheels rotating all in the same sense although this would tend to have a deleterious effect on the flow. Furthermore, while the flow has been shown as only effecting one half of each water wheel, an arrangement could be envisaged in which the water flow passes around a large amount of the wheel circumference, more in the nature of a turbine. The size of the various wheels could be varied so that at higher pressures of the flow, smaller wheels are used than at lower pressures of the flow It will be understood that the above described embodiment is provided purely as an example and that the invention is not limited thereto. The invention not only includes this embodiment but also any additions to or modifications of this embodiment as lie within the scope or spirit of the invention

The invention claimed is:

1. An hydraulic electrical generator for converting the kinetic energy of rivers and streams to electricity comprising: a water channel having an inlet receiving water from a river or stream and an outlet exiting water from the generator; a plurality of water wheels, located in said channel between said inlet and said outlet, and connected hydraulically in series with at least two said water wheels adapted to be driven in the same sense by said water flowing through said water channel, and adjacent water wheels adapted to be driven in opposite senses, an individual electrical generator driven individually by each said water wheel, and mechanical means mechanically connecting said at least two water wheels being driven in the same sense together.

2. A generator as claimed in claim 1, and comprising a venturi feeding the first of said waterwheels in the series to increase the water pressure.

3. An hydraulic electrical generator for converting the kinetic energy of rivers and streams to electricity comprising, a number of water wheels and connected hydraulically in series with at least two said water wheels being driven in the same sense, an individual electrical generator driven individually by each said water wheel, and mechanical means mechanically connecting said at least two water wheels being driven in the same sense; and bypass means to selectively divert a flow of water to bypass the flow around one or more of said water wheels so that certain water wheels can be taken out of service.

4. An hydraulic electrical generator for converting the kinetic energy of rivers and streams to electricity comprising a plurality of water wheels, connected hydraulically in series with at least two said water wheels being driven in the same sense, an individual electrical generator driven individually by each said water wheel, and mechanical means mechanically connecting said at feast two water wheels being driven in the same sense together, said water wheels each comprising a drum having an exterior surface, vanes carried on said exterior surface of the drum, pivot means for pivoting said vanes to said exterior surface of the drum and adapted to automatically fold the vanes against the drum surface during the part of a drum rotation where they are not in contact with the water flow; the vanes having a first section which, in the unfolded condition, extends at right angles to said exterior surface of the drum and a second section, generally at right angles to said first section in a direction opposite to the intended flow direction of the water flow.

5. A generator as claimed in claim 4 including unfolding means for unfolding the vanes before they come into contact with the water flow.

6. A generator as claimed in claim 4, wherein said second section of said vane defines a curve following a notional surface coaxial with said drum.

7. A generator as claimed in claim 4, wherein further comprising step up gearing provided between the drum and the associated generator.

8. An hydraulic electrical generator for converting the kinetic energy of rivers and streams to electricity comprising a plurality of water wheels, means connecting said wheels hydraulically in series with at least two said water wheels being driven in the same sense, an individual electrical generator driven individually by each said water wheel, and mechanical means mechanically connecting said at feast two water wheels being driven in the same sense together, said water wheels each comprising a drum having an exterior surface, vanes carried on said exterior surface of the drum, pivot means for pivoting said vanes to said exterior surface of the drum and adapted so that they can be folded against the drum surface during the part of a drum rotation where they are not in contact with the water flow and unfolding means for unfolding the vanes before they come into contact with the water flow, said vanes comprising a first section which, in the unfolded condition, extends at right angles to said exterior surface of the drum and a second section, generally at right angles to said first section in a direction opposite to the intended flow direction of the water flow, said second section of said vane defining a curve following a notional surface coaxial with said drum.

9. A generator as claimed in claim 8, and comprising step up gearing provided between said drum and the associated generator.

10. A generator as claimed in claim 9, wherein said drum comprises an inner surface, an annular set of teeth located on said inner surface and a pinion gear, meshing with said teeth connected to drive the said associated generator.

* * * * *